United States Patent [19]

Zipay et al.

[11] Patent Number: 4,565,554
[45] Date of Patent: Jan. 21, 1986

[54] STEAM SEPARATING APPARATUS AND SEPARATORS USED THEREIN

[75] Inventors: Albert J. Zipay, Clifton; Walter P. Gorzegno, Morristown, both of N.J.

[73] Assignee: Foster Wheeler Energy Corporation, Livingston, N.J.

[21] Appl. No.: 622,308

[22] Filed: Jun. 20, 1984

Related U.S. Application Data

[63] Continuation of Ser. No. 415,303, Sep. 7, 1982, Pat. No. 4,483,696.

[51] Int. Cl.$^4$ .............................................. B01D 19/00
[52] U.S. Cl. ...................................... 55/185; 55/204; 55/348; 55/440; 55/464
[58] Field of Search ................. 55/176, 177, 185, 186, 55/204, 440, 442–444, 464, 347, 348, 455; 122/488–491

[56] References Cited

U.S. PATENT DOCUMENTS

| | | | |
|---|---|---|---|
| 1,999,950 | 4/1935 | Waters | 55/186 |
| 2,106,589 | 1/1938 | Bigger et al. | 55/185 |
| 2,197,189 | 4/1940 | Morgan | 55/444 |
| 2,320,343 | 6/1943 | Bailey | 55/440 X |
| 2,395,855 | 3/1946 | Fletcher | 55/349 |
| 2,472,101 | 6/1949 | Frisch | 55/440 |
| 2,532,332 | 12/1950 | Rowand | 55/462 X |
| 2,648,397 | 8/1953 | Ravese et al. | 55/440 X |
| 2,715,451 | 8/1955 | Raynor | 55/440 X |
| 2,732,028 | 1/1956 | Coulter | 55/440 X |
| 2,763,245 | 9/1956 | Place | 55/455 X |
| 2,891,632 | 6/1959 | Coulter | 55/442 |
| 2,895,566 | 7/1959 | Coulter | 55/440 X |
| 2,954,842 | 10/1960 | Coulter | 55/440 |
| 3,314,220 | 4/1967 | Goldstein | 55/347 X |
| 3,631,656 | 1/1972 | Hausberg et al. | 55/440 X |
| 3,751,886 | 8/1973 | Sokolowski | 55/440 X |
| 3,788,282 | 1/1974 | Modrak et al. | 55/348 X |
| 3,915,679 | 10/1975 | Roach et al. | 55/348 X |
| 4,002,444 | 1/1977 | Artemov et al. | 55/440 X |
| 4,017,275 | 4/1977 | Hodgson et al. | 55/440 X |
| 4,264,411 | 4/1981 | Almond, Jr. | 55/440 X |

FOREIGN PATENT DOCUMENTS

| | | | |
|---|---|---|---|
| 23691 | of 1903 | United Kingdom | 55/440 |
| 404490 | 3/1974 | U.S.S.R. | 55/440 |

Primary Examiner—Robert Spitzer
Attorney, Agent, or Firm—Marvin A. Naigur; John E. Wilson; Warren B. Kice

[57] ABSTRACT

A steam separating apparatus wherein a first separating unit receives a steam-water mixture and discharges said mixture in a substantially tangential direction against an impingement plate to separate some water from said mixture. A second separating unit is disposed in a fluid flow relation to the first separating unit and includes a plurality of plates together formed into a closed circular configuration. The latter plates are shaped in a manner to define a plurality of irregular paths for the passage of said mixture so that said mixture impinges on said plates as it passes through said paths to separate additional water from said mixture.

2 Claims, 9 Drawing Figures

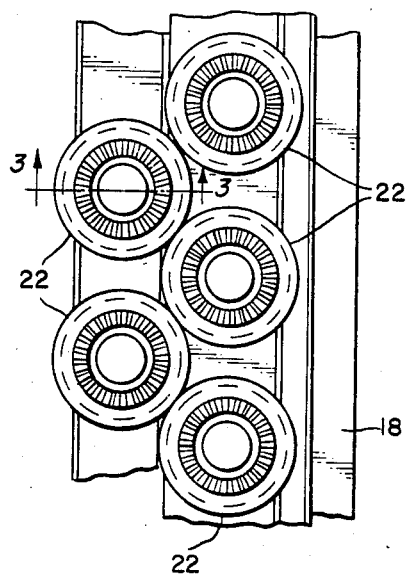
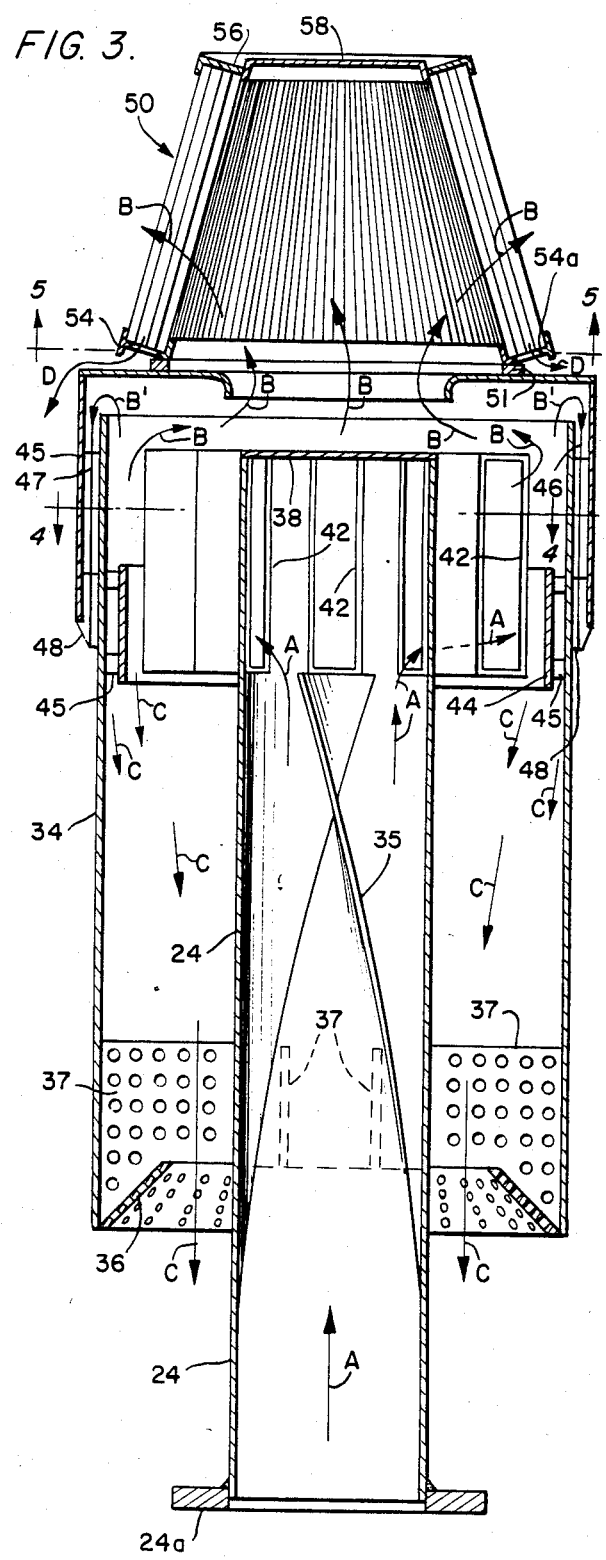
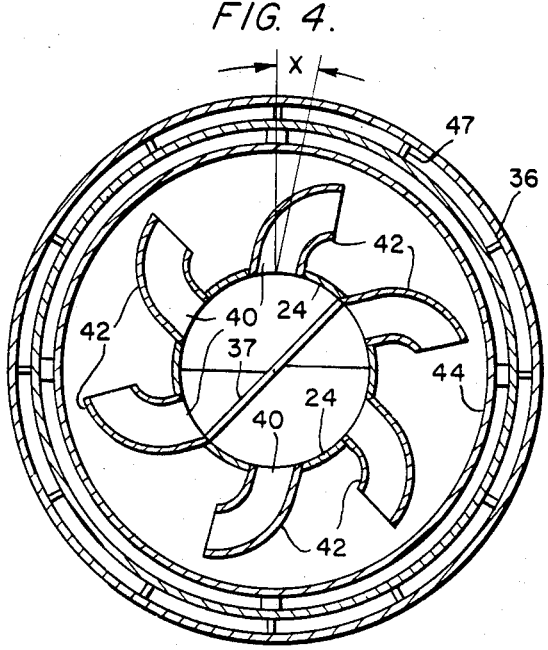

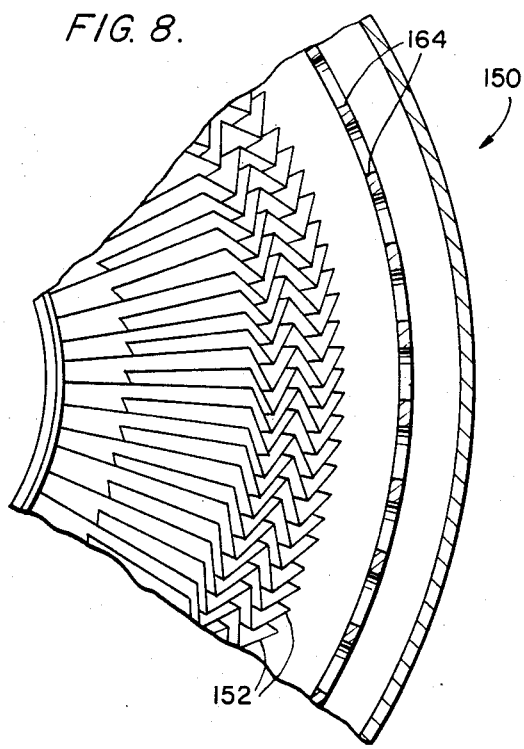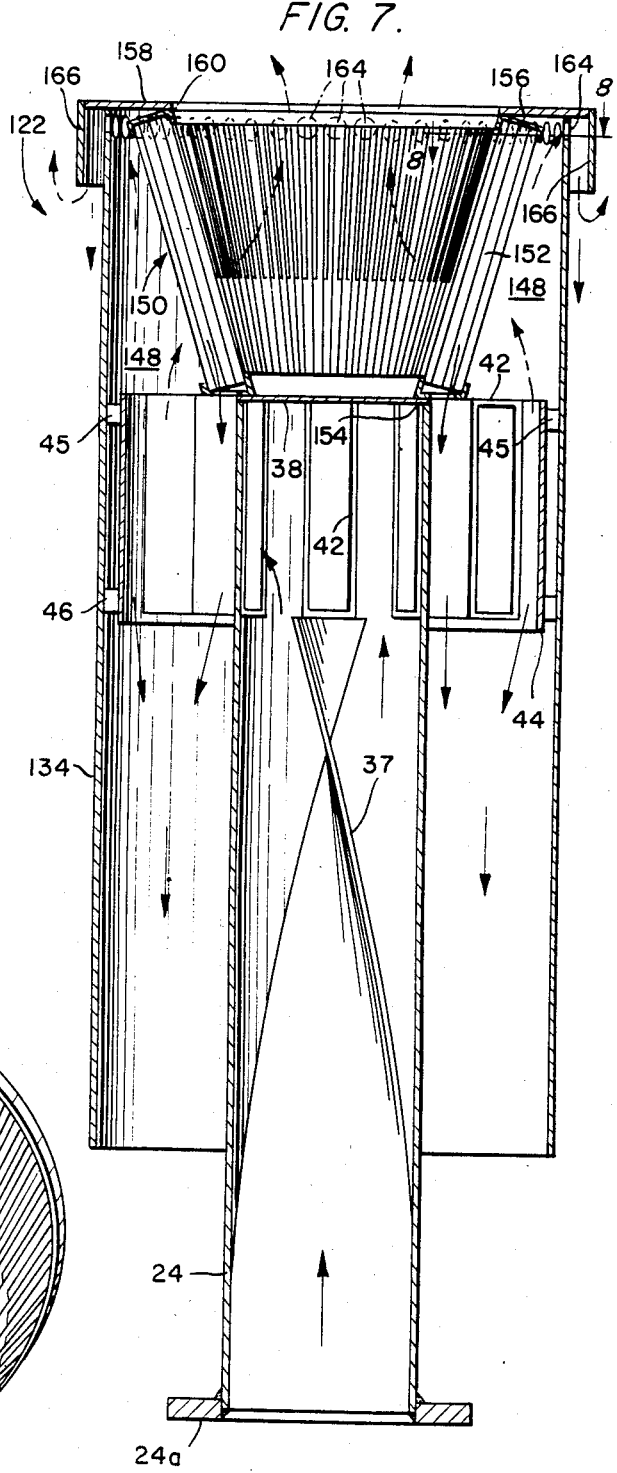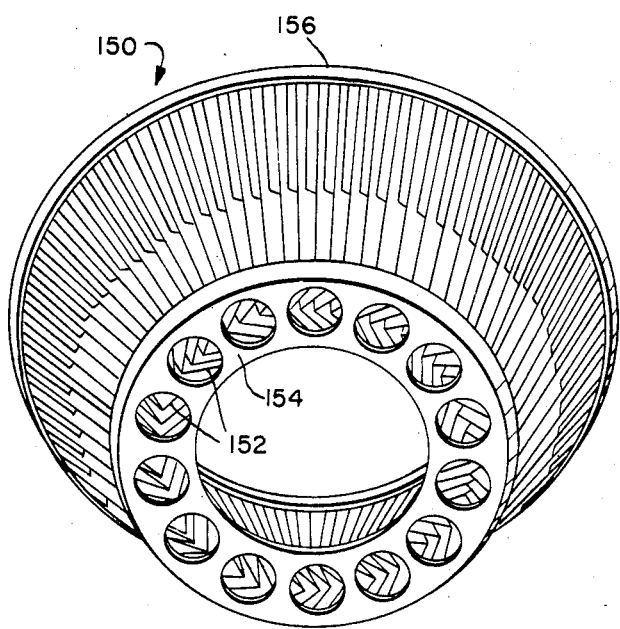

STEAM SEPARATING APPARATUS AND SEPARATORS USED THEREIN

This is a continuation of application Ser No. 415,303, filed Sept. 7, 1982 now U.S. Pat. No. 4,483,696.

BACKGROUND OF THE INVENTION

This invention relates to a steam separating apparatus and, more particularly, to an apparatus for receiving a mixture of liquid and vapor and separating the liquid from the vapor.

In natural circulation vapor generators, mixtures of water and steam rise in heated steam-generating tubes and discharge into one or more large steam drums disposed in an elevated position above the tubes. The drums include means to separate the water from the steam with the latter being removed through openings in the upper portions of the drum and the former being recirculated through downcomers to the boiler and back to the steam generating tubes to complete the natural circulation loop.

In relatively large installations employing natural circulation vapor generators, it is essential that an efficient separation of the steam from the water be effected in the drum with minimal pressure loss in order to furnish steam of the required purity to the point of use, and steam-free water to the circulation system. To this end, many previous arrangements have used separators having spiral arms which discharge the steam-water mixture tangentially towards the inner wall of a shell, or skirt, to promote the separation. Although satisfactory for most purposes, this type of arrangement, even if combined with another drying stage, does not insure maximum separation and is therefore less than completely desirable for more stringent applications.

SUMMARY OF THE INVENTION

It is therefore an object of the present invention to provide a steam separating apparatus and a separator utilized therein, in which liquid is separated from the vapor in multiple stages at a relatively low pressure loss.

It is a further object of the present invention to provide a separating apparatus of the above type which includes a spiral arm separator for providing a first stage of separation and an additional separator for providing a second stage of separation before a subsequent drying stage.

It is a further object of the present invention to provide a separating unit which provides the above-mentioned second stage separation and which is formed by a plurality of W-shaped plates arranged in a frusto-conical configuration.

It is a further object of the present invention to provide an apparatus and separator of the above type which is of a simple, efficient and inexpensive design.

It is a still further object of the present invention to provide a steam separating apparatus in which a plurality of the above-mentioned separating apparatuses are provided in a steam separation drum.

Toward the fulfillment of these and other objects, the steam processing apparatus of the present invention comprises a first separating unit for receiving a steam-water mixture and discharging the separated water in a substantially tangential direction against an impingement plate to separate some steam remaining in the water; and a second separating unit disposed in a fluid flow relation to the first separating unit, the second separating unit comprising a plurality of plates together formed into a closed circular configuration, the plates being shaped in a manner to define a plurality of irregular paths for the passage of the steam so that the steam impinges on the plates as it passes through the paths to separate the remaining water from the steam.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which:

FIG. 2 is a cross-sectional view taken along the line 2—2 of FIG. 1;

FIG. 3 is a cross-sectional view taken along line 3—3 of FIG. 2;

FIG. 4 is a cross-sectional view taken along line 4—4 of FIG. 3;

FIG. 7 is a view similar to FIG. 3, but depicting an alternate embodiment of the present invention; and FIGS. 8 and 9 are views similar to FIGS. 5 and 6, respectively, of the embodiment of FIG. 7.

DESCRIPTION OF THE PREFERRED EMBODIMENT

Figure 1:
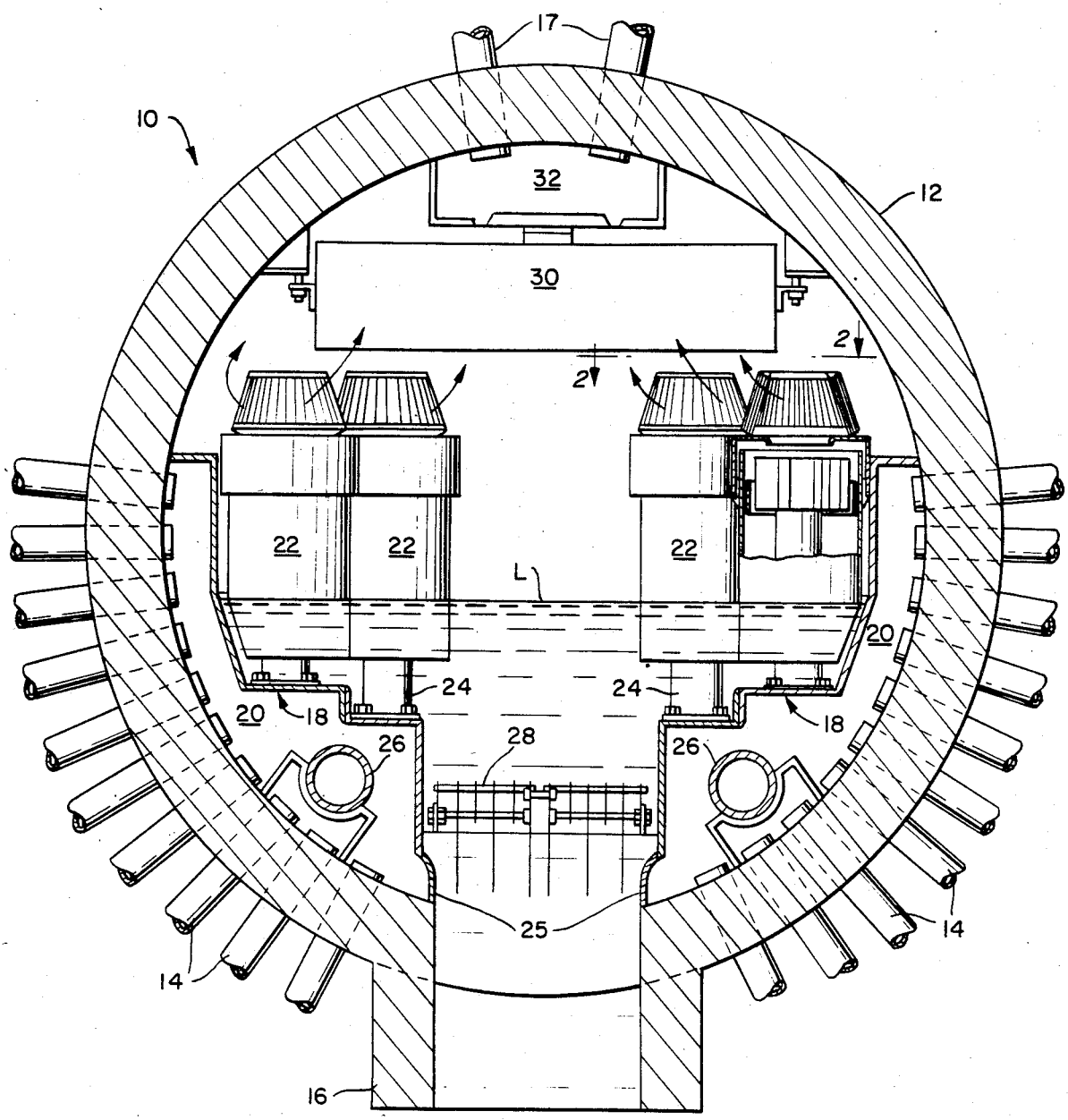
FIG. 1 is a vertical cross-sectional view of the steam separating drum incorporating features of the present invention.

Referring specifically to FIG. 1 of the drawings, the reference numeral 10 refers in general to the steam processing apparatus of the present invention which includes a steam drum 12 which forms a portion of a natural circulation steam-water system. The drum 12 is of an elongated cylindrical shape and is disposed with its axis parallel to the horizontal. The upper end portions of two groups of steam generating risers or tubes 14 extend through the drum 12 and communicate with the interior of the drum to introduce a mixture of water and steam into the drum. A plurality of downcomers (one of which is shown by the reference numeral 16) extend from the lower portion of the drum to discharge the separated water (along with a quantity of feed water) to a furnace (not shown) where the water is heated and recycled back through the drum 12. Dried steam is removed from the drum 12 through a plurality of discharge tubes 17 disposed at the upper portion of the drum.

An elongated girth baffle 18 is provided within the drum immediately above the end portions of the tubes 14 to define a chamber 20 for receiving the mixture of water and steam from the tubes 14. A plurality of separating units 22 are disposed in the drum 12 and are arranged in four horizontally extending rows, two extending to either side of the axis of the drum. Each separating unit 22 includes a riser pipe 24, the lower end portion of which is bolted to the girth baffle 18 and communicates, through an appropriate opening in the baffle, with its respective chamber 20 for receiving the water-steam mixture from the latter chamber 20. Although not clear from the drawings, it is noted that the chamber 20 takes the form of a concentric annulus inside the drum 12 that permits flow from one side of the drum to the other. This annulus is interrupted only by the bell mouth structure 25 surrounding the openings in the drum 12 for the downcomers 16. Therefore, water can flow through an openg girth area in between the latter bell mouth structures.

Two horizontally extending feed pipes 26 are disposed in the chamber 20 and are adapted to introduce makeup water into the drum 12 which flows through the separating units 22 with the mixture of water and steam to replenish the supply of steam that is discharged from the drum and, thus, maintain a constant water level, shown by the reference letter L. This water passes downwardly through a vortex eliminator 28 to the downcomer 16 for discharge back into the natural circulation loop. The vortex eliminator 28 operates in a conventional manner to prevent swirling of the water as it discharges from the drum 12 into the downcomer 16, and prevents the steam from being drawn from the upper portion of the drum 12 into the downcomer. In addition, the vortex eliminator 28 reduces the entrance loss to the downcomer 16. Since the vortex eliminator 28 is of a conventional design, it will not be described in any further detail.

A plurality of steam dryers are disposed in the upper portion of the drum 12 with one being shown by the reference numeral 30 in FIG. 1. The dryers 30 are supported by a conventional support structure in a position immediately above the separating units 22 and immediately below a dry box 32, also of a conventional design. The dryers 30 include a plurality of V-shaped plates (not shown) which are in a nested, but spaced, relationship and may be of the type disclosed in U.S. Pat. No. 2,472,101, issued on June 7, 1949. The dryers 30 function to dry the steam discharging from the upper portion of the separating units 22 and separate any entrained water particles carried over with the steam as it flows through the space between the nested plates. The dried steam flows through the dry box 32 for discharge from the tubes 17.

FIG. 2 depicts the two adjacent rows of separating units 22 disposed on one side of the axis of the drum 12. The separating units 22 in each row are spaced slightly apart in a horizontal direction with a portion of each separator of a particular row extending partially into the space between adjacent separators of the adjacent row, to minimize the space taken up by the units 22 and thus reduce the length of the drum 12.

Referring specifically to FIGS. 3 and 4 which depict the details of a separating unit 22, the reference numeral 34 refers to an upright cylindrical shell through which the riser pipe 24 extends in coaxial relationship. The riser pipe 24 has a flanged end portion 24a which is bolted to the girth baffle 18 (FIG. 1) and receives a mixture of a water and steam from the tubes 14 through a complementary opening formed in the latter baffle.

A twisted baffle 35 is provided in the riser pipe 24 to impart a pre-spin to the mixture as it passes upwardly through the pipe. A flow diffuser 36, along with a plurality of spaced anti-vortex plates 37, are disposed in the annular space between the outer wall of the riser pipe 24 and the inner wall of the shell 34. Since these components are of a conventional design they will not be described in any further detail.

A cap 38 extends over the upper end of the pipe 24 and a plurality of slots 40 (FIG. 4) are formed through the upper wall portion of the pipe 24. A plurality of substantially spiral shaped arms 42 are connected to the pipe 24 in registry with the slots 40, respectively, with the free ends of the arms being open to permit the separated water-steam mixture to discharge therefrom in a substantially tangential direction relative to the shell 34. According to a particular feature of the present invention, the axis of the end portion of each arm 42 extending from the pipe 24 is offset approximately 10° to a plane extending through the radius of the pipe as shown by the angle X in FIG. 4. A skirt 44 (FIGS. 3 and 4) is provided between the discharge ends of the slots 40 and the inner wall of the shell 34 and is supported in the position shown by a plurality of struts 45.

A hood 45 extends over the upper end portion of the shell 34 providing a radial opening and an annular opening 46 containing anti-swirl plates 47. The hood 45 is supported relative to the shell 34 by a plurality of studs 48 spaced around the outer surface of the shell.

Figure 5:
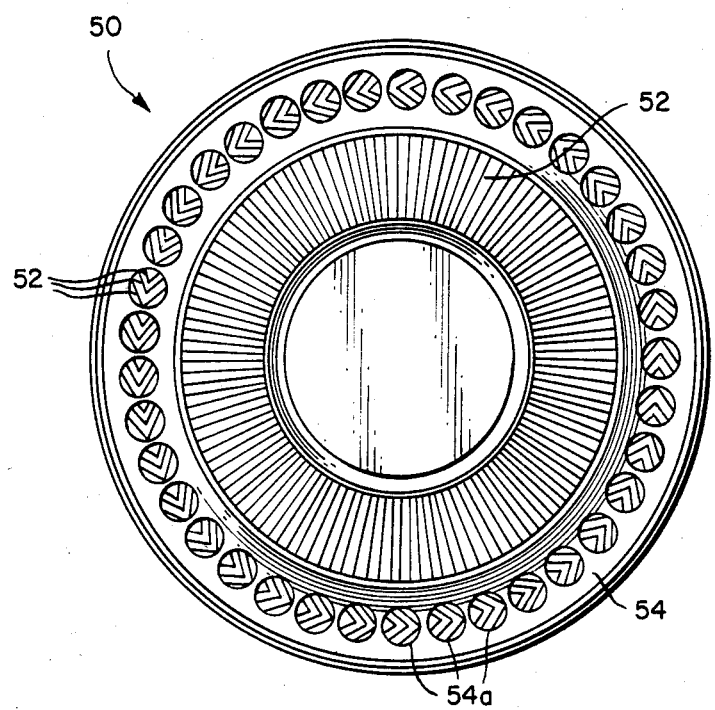
FIG. 5 is a partial cross-sectional view along line 5—5 of FIG. 3.
Figure 6:
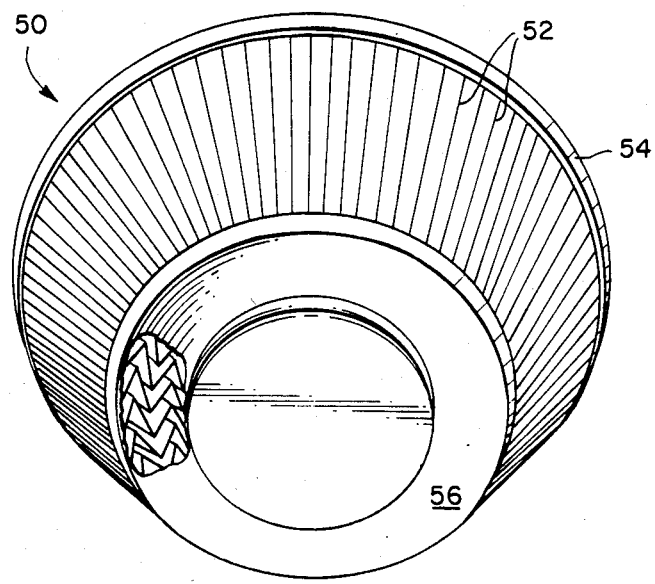
FIG. 6 is a perspective view of the separating unit of FIG. 3.

A second-stage separator 50 having a substantial frusto-conical configuration rests on a support ring 51 disposed on the upper surface of the hood 45. As better shown in connection with FIGS. 5 and 6, the separator 50 is formed by a plurality of plates 52 formed into a "W" cross-sectional configuration. The plates 52 are nestled within each other with a slight spacing therebetween to define a plurality of irregular W-shaped passages for the steam-water mixture. The plates 52 converge radially inwardly from bottom to top to form a frusto-cone and are secured in the position shown between two annular shrouds 54 and 56 which are secured to the respective end portions of the plates 52. As shown in FIG. 3, the lower shroud 54 rests upon the upper surface of the support ring 51 and has a plurality of spaced drain openings 54a (FIGS. 3 and 5) formed therein. The upper shroud 56, together with a cap 58, covers the upper end of the separator 50.

In operation, the mixture of steam and water to be separated enters the end portion 24a of the riser pipe 24, rises in the latter pipe, and then passes radially outwardly from the pipe through the slots 40 and into the arms 42 where it is directed tangentially against the inner walls of the skirt 44 and the shell 34, as shown by the flow arrows A. This creates a vortex, or swirling stream of fluid, with the resulting centrifugal forces causing the vapor portion of the mixture to travel away from the inner wall of the shell 34 and towards the center of the swirling stream and pass upwardly, by virtue of its buoyance, into the separator 50 and the annular opening 46 as shown by the flow arrows B and B', respectively, where further separation steps occur, as will be described. The water portion of the mixture from the arms 42 collects on, and flows down, the inner walls of the skirt 44 and the shell 34 until it falls through the lower portion of the shell, as shown by the flow arrows C, where it passes through the anti-vortex plates 37 and the flow diffuser 34 before discharging into the reservoir of water disposed above the girth baffle 18 (FIG. 1) and then through the vortex eliminator 28 and into the downcomer for recirculation.

The steam from the spiral arms 42, which contains a reduced portion of water, rises upwardly from the skirt 44 and the shell 34. A small portion of the steam, as shown by the flow arrows B', passes through the radial opening between the top of the shell 34 and the hood 45 and then through the anti-swirl plates 47 in the annular opening 46 from which it discharges with the water falling downwardly and the steam rising upward. A great majority of this steam flows into the interior of the separator 50 and then passes through the irregular passages defined by the nested plates 52 in a substantially radial direction outwardly from the separator 50, as shown by the flow arrows B. The passage through the W-shaped plates 52 causes a further separation of the water from the steam due to the impingement against the latter plates and the resultant collection of water on the plates. In addition, the steam discharges from the passages in a substantial tangential direction, thus creating another vortex, with the resultant centrifugal forces promoting additional separation as discussed above. The water thus removed from the steam passes downwardly through the openings 54a in the lower shroud 54, as shown by the flow arrows D, where it impinges on the upper surface of the hood 45 before passing directly to the water reservoir disposed above the girth baffle 18 (FIG. 1). As also shown in FIG. 1, the steam from the separators 50 passes upwardly in the drum 12, through the dryers 30 and the dry box 32 before exiting via the discharge tubes 17.

Thus, a multi-stage separation process is achieved, initially through the spiral arms 42 against the skirt 44 and shell 34, and then through the plates 52 of the separator 50 before a final drying occurs in the dryers 30.

As a result of the above, a great majority of the water is separated from the mixture of steam and water entering the end portion 24a of the riser pipe 24 associated with each separator.

FIGS. 7-9 depict the details of a separating unit 122 according to an alternate embodiment of the present invention. Since the separating unit 122 contains many components, including the spiral arm separating stage, that are identical to those of the previous embodiment, these components are referred to by the same reference numerals and will not be described in any further detail. According to the embodiment of FIGS. 7 and 9, an upright cylindrical shell 134 is provided which has an extended length upward when compared to the shell 34 of the previous embodiment and which defines an upper chamber 148 extending above the spiral arms 42.

Disposed in the chamber 148 is a second-stage separator 150 having a substantial frusto-conical configuration. As better shown in connection with FIGS. 8 and 9, the separator 150 is formed by a plurality of plates 152 formed into a "W" cross-sectional configuration. The plates 152 are nestled within each other with a slight spacing therebetween to define a plurality of irregular W-shaped passages for the steam-water mixture. The plates 152 diverge radially outwardly from bottom to top to form an inverted frusto-cone and are secured in the position shown between two annular shrouds 154 and 156 which are secured to the respective end portions of the plates 152. The lower shroud 154 rests upon the upper portion of the spiral arms 42 and the upper shroud 156 extends immediately below a hood 158 extending over the upper end of the shell 134 and having a central opening 160.

As a result of the foregoing, the steam from the spiral arms 42, which contain a reduced portion of water, rises upwardly from the skirt 44 and into the chamber 148. A great majority of the steam then passes in a substantially radial direction through the irregular passages defined by the nested plates 152 and into the open central portion of the separator 150, as shown by the dashed arrows. The passage through the W-shaped plates 152 causes a further separation of the water from the steam due to the impingement against the latter plates and the resultant collection of water on the plates. In addition, the steam discharges from the passages in a substantial tangential direction, thus creating a vortex, with the resultant centrifugal forces promoting additional separation as discussed above.

The water thus removed from the steam passes downwardly through a plurality of openings in the lower shroud 154, as shown by the solid arrows, and through the lower portion of the shell 134 where it combines with water discharging from the arms 42 and passes into the drum 12. The steam from the central portion of the separator 150 passes upwardly and discharges through the central openings 160 in the hood 158 for passage to the dryers 30 and the dry box 32, as discussed above.

A portion of the steam entering the chamber 148 from the spiral arms 42 will pass directly to the upper portion of the shell 136 outside the separator 150 and discharge through a plurality of openings 164 in the upper end portion of the shell. The hood 158 includes a cylindrical rim 166 which extends over the openings 164 in a spaced relation thereto in the path of the water discharging through the openings. Water from the rim 166 falls downwardly into the lower portion of the drum 12 and any steam separated during this activity rises upwardly and discharges with the steam passing through the opening into the dryers 30.

Thus, a multi-stage separation process is achieved, initially through the spiral arms 42 against the skirt 44, and then through the plates 152 of the separator 150 with a portion passing through the openings 164 in the upper end of the shell 134 and against the rim 166 of the hood 158, before a final drying and separation occurs in the dryers 30.

As in the previous embodiment, a great majority of the water is separated from the mixture of steam and water entering the end portion 24a of the riser pipe 24 associated with each separator. A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claim is:

1. A steam separator comprising an outer shell, a hood extending over the upper end portion of said shell and defining a first outlet passage for directing a portion of a steam-water mixture from a previous separator stage in a downwardly direction and a second outlet passage for directing another portion of said mixture in an upwardly direction, a plurality of plates extending over and supported by said hood, each plate having a W-shaped cross-section and being nested between two adjacent plates in a spaced-apart parallel relationship to define a radially extending W-shaped path between each two adjacent plates, shroud means disposed at the upper and lower end portions of said plates for supporting said plates in a frusto-conical configuration with said W-shaped cross-section extending in a general radial direction, said frusto-cone converging radially inwardly from the lower portion of said cone to the upper portion thereof; means for directing the steam water mixture portion from said second outlet passage from the interior of the frusto-cone radially outwardly through said paths so that is impinges on said plates to separate the steam from the water in said mixture, said plates being arranged to discharge said mixture from said paths in a substantial tangential direction to said frusto-cone, and at least one opening extending through said shroud means for permitting said water to drain therefrom.

2. A steam separator comprising an outer shell, a plurality of plates disposed within the upper portion of said outer shell, each having a W-shaped cross-section and being nested between two adjacent plates in a spaced-apart parallel relationship to define a radially extending W-shaped path between each two adjacent plates, shroud means disposed at the upper and lower end portions of said plates for supporting said plates in a frusto-conical configuration with said W-shaped cross-section extending in a general radial direction, said frusto-cone converging radially inwardly from the upper portion of said cone to the lower portion thereof, means for directing a steam-water mixture radially through said paths from the exterior of said frusto-cone to the interior thereof so that said mixture impinges on said plates to separate the steam from the water in said mixture, said plates being arranged to discharge said mixture from said paths in a substantially tangential direction to said frusto-cone, at least one opening extending through said shroud means for permitting said water to drain therefrom, a plurality of openings formed in the upper end portion of said shell to permit a radial discharge of a portion of said mixture, and a plate disposed in the path of the mixture discharging through said latter openings for diverting the mixture downwardly and promoting separation of the steam from the water.

* * * * *